United States Patent [19]

Webster

[11] 4,228,500

[45] Oct. 14, 1980

[54] COMMAND STACKING APPARATUS FOR USE IN A MEMORY CONTROLLER

[75] Inventor: Marvin K. Webster, Glendale, Ariz.

[73] Assignee: Honeywell Information Systems Inc., Phoenix, Ariz.

[21] Appl. No.: 890,006

[22] Filed: Mar. 27, 1978

[51] Int. Cl.³ .......................... G06F 13/00; G06F 3/04
[52] U.S. Cl. ..................................... 364/200; 364/900
[58] Field of Search ... 364/200 MS File, 900 MS File

[56] References Cited

U.S. PATENT DOCUMENTS

| 3,623,006 | 11/1971 | Balakian et al. | 364/200 |
| 3,825,902 | 7/1974 | Brown et al. | 364/200 |
| 4,023,143 | 5/1977 | Braunstein | 364/200 |
| 4,034,347 | 7/1977 | Probert, Jr. | 364/200 |
| 4,062,059 | 12/1977 | Suzuki et al. | 364/900 |
| 4,115,851 | 9/1978 | Nagano et al. | 364/200 |
| 4,151,598 | 4/1979 | Webster | 364/900 |

Primary Examiner—Harvey E. Springborn

Attorney, Agent, or Firm—W. W. Holloway, Jr.; R. T. Reiling

[57] ABSTRACT

In a stack for use in a data processing system memory controller, information which includes data, instructions and/or commands generated by a requesting unit requesting access to memory are accepted and temporarily stored in the stack if such memory is unavailable. The newest information from any requesting unit that must be temporarily stored is stored in the lowest unoccupied level of the stack. Associated with each stack level is a busy flip-flop which is set when the information is stored in its associated stack level. The busy flip-flop is reset when the information is given access to the memory. The level busy flip-flops are monitored to detect when the stack is full thus indicating that further requests be inhibited. By monitoring the number of levels in the stack that are filled at various times, a measure of throughput can be achieved in order to determine whether the stack should be enlarged or made smaller.

10 Claims, 3 Drawing Figures

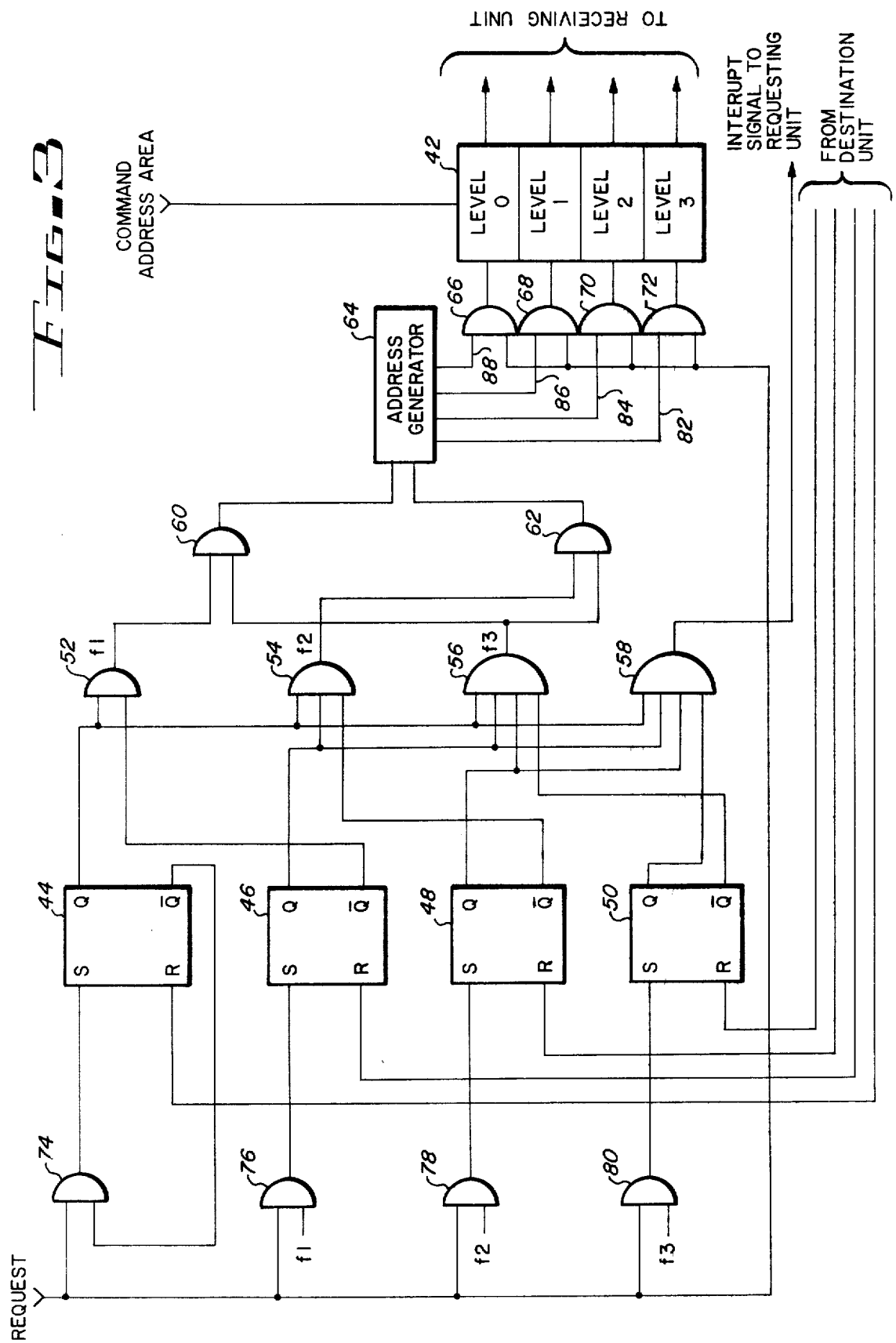

COMMAND STACKING APPARATUS FOR USE IN A MEMORY CONTROLLER

CROSS REFERENCES TO RELATED APPLICATIONS

This is related to U.S. Pat. No. 4,151,598 issued Apr. 24, 1979, entitled "Priority Assignment Apparatus for Use in a Memory Controller", filed of even date herewith and assigned to the assignee of the present invention.

BACKGROUND OF THE INVENTION

1. Field of the Invention

This invention relates generally to memory systems for use in data processing equipment and, more particularly, to a memory controller stacking apparatus which accepts and stores commands, instructions, or data generated by a requesting unit until a designated receiving unit is available to receive the information.

2. Prior Art

Modern data processing systems include various subsystems for performing the functions of manipulating, storing and communicating data. Such a system would include, for example, a central processor, a memory, a plurality of input/output (I/O) devices and a control unit. Such data processing systems may differ significantly in configuration; i.e., various functionalities may be located in different subsystems in accordance with particular design criteria. Likewise, the required interface circuitry for communication between the various subsystems may differ both in functionality and operation.

Typically, the central processor manipulates the data in accordance with a series of decodeable instructions called a program. These program instructions are generally retrieved sequentially by the processor and, along with the data which is to be operated upon, are stored in memory devices.

Such memory devices may be of several well known types; however, most commonly used for main memory is a random access device having discrete addressable locations each of which provides storage for a word which may comprise data and/or commands and may contain specific fields useful in a variety of operations. Generally, when the processor is in need of data or instructions, it will generate a memory cycle and provide an address to the memory in order to retrieve the data or word stored in that address.

The series of instructions comprising the program is usually loaded into memory at the beginning of each operation, and occupies a block of memory which normally must not be disturbed or altered until a program has been completed. Data to be operated upon by the processor in accordance with stored instructions is stored in other areas of memory and are retrieved and replaced in accordance with the program instructions.

Communication between the outside world and the data processing system is usually accomplished through the use of a plurality of I/O devices, including such apparatus as magnetic tape handlers, paper tape readers, punch-card readers and remote terminal devices. To control the transfer of information between the I/O devices, an input/output control means is provided which couples the various I/O devices to the processor. The input/output controller coordinates the information flow to and from the various I/O devices and also awards priority when more than one I/O device is attempting to communicate with the rest of the system. Since the I/O devices are usually electromechanical in nature and, as such, are characterized by much lower operating speeds than the remainder of the data processing system, the input/output controller provides buffering to enable the remainder of the processing system to proceed at its normal rate. In many applications, it is advantageous to utilize more than one processor and more than one memory. Likewise, such systems generally require a large number of I/O devices, thus, requiring several input/output controllers.

A memory controller is provided to coordinate communications among the processor, memory devices, and I/O controllers. It receives requests for access to memory as well as specific requests for communications to other subsystems. The memory controller coordinates the execution of operations and transfers of information and may also provide a means for assigning priority when requests for access to memory are generated by more than one subsystem.

A typical data processing system may contain a single memory controller; however, multicomputer configurations may utilize several memory controllers.

In those environments wherein more than one memory controller is employed, each of the memory controllers is independent from each other and they function simultaneously thus providing parallelism in accessing of the memory system. Each memory controller will temporarily store requests from the processors and input/output controllers and generally service these subsystems in accordance with a priority scheme. Data transfers between the various communicating devices and the memory controller are word oriented, e.g., 40 bits. Typical data processing systems employing memory controllers are shown and described in U.S. Pat. No. 3,413,613, entitled "Reconfigurable Data Processing System".

The instructions and/or commands and/or data which are forwarded to the memory controller are accepted and temporarily stored in a stack comprised of a plurality of registers until the appropriate destination units are available to process the information. Once stacked, the instructions or commands are generally forwarded to the destination units on a First In/First Out basis. A write counter determines which register in the stack receives the incoming information and a read counter selects the register whose contents are to be passed on to its destination unit next. The presence of a command in the stack is usually detected by comparing the contents of the write counter to the contents of the read counter. If they are unequal, this indicates that the stack contains information to be passed on. The write counter is advanced when a request is received by the memory controller, and the read counter is advanced when the information is passed from the stack to the destination unit. If the destination unit corresponding to the next command to be read out of the stack is busy, other commands which occupy a lower position in the stack cannot be forwarded even if their particular destination units are free. Thus, one busy destination unit can effectively block commands destined for free units. This is clearly inefficient and accounts for undue delays in a technology where speed may be of utmost importance.

Further, since the stack has a finite depth (or number of levels), the danger exists that the write counter will exhaust all available locations in the stack and will wrap around upon itself thus writing new information into a stack location before the contents of that location have been forwarded to its destination unit. If this overflow occurs, the contents of the register or registers in question is lost resulting in a system error. Using the above described approach, it is difficult to determine when the stack becomes full with information that has not been forwarded to the respective destination units. Further, since this arrangement operates sequentially, it is difficult to determine how busy the stack actually is, i.e., an indication of throughput.

SUMMARY OF THE INVENTION

It is an object of the present invention to provide a stacking apparatus for use in a memory controller, wherein errors due to overflow are substantially reduced.

It is a further object of the present invention that the inventive stacking apparatus be such as to permit an easy determination of stack throughput.

According to a broad aspect of the invention there is provided an apparatus for storing incoming data in a storage level of a multi-level storage stack, comprising: detecting circuitry for determining the lowest level in said stack which is unoccupied; and enabling circuitry coupled to said detecting circuitry and to said stack for loading said data into said lowest level.

The above and other objects of the present invention will be more clearly understood from the following detailed description taken in conjunction with the accompanying drawings, in which:

BRIEF DESCRIPTION OF THE DRAWINGS

FIG. 3 is a more detailed logic diagram of a stacking apparatus for use in a memory controller according to the present invention.

DESCRIPTION OF THE PREFERRED EMBODIMENT

Figure 1:
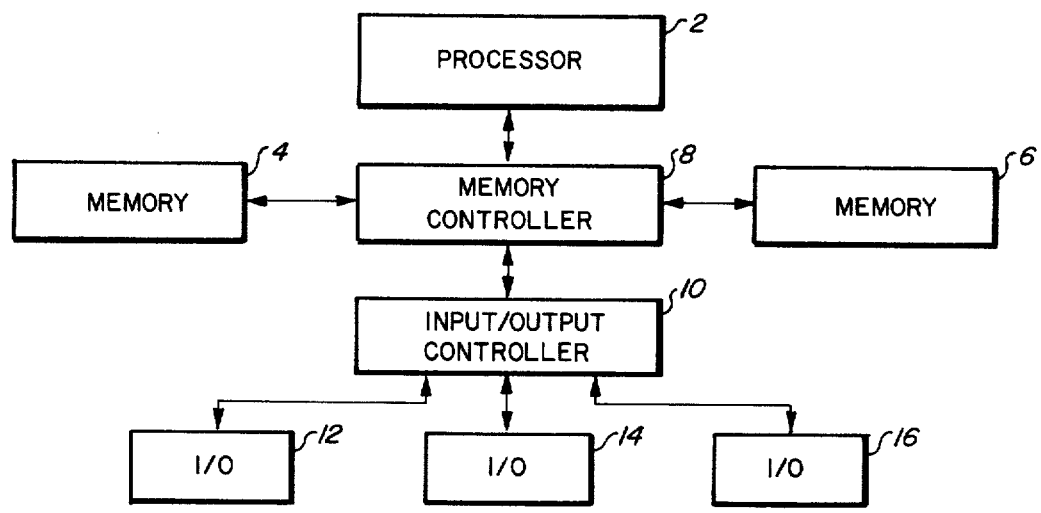
FIG. 1 is a block diagram of a data processing system employing a memory controller in accordance with the prior art.

FIG. 1 is a block diagram of a single memory controller configuration data processing system. The data processing system includes a data processor 2, memory devices 4 and 6, and input/output controller 10, and a plurality of I/O devices 12, 14, and 16. The processor, I/O controller, and memories are interconnected by a memory controller 8 which controls access to memory devices 4 and 6 and also provides communication control between processor 2 and/or I/O controller 10. As stated previously, memory controller 8 acts as a data processing coordinating device for overseeing intersystem communications, as well as performing certain functions within itself. A stacking apparatus is provided in the memory controller to accept and temporarily store command, instructions, and/or data information destined for memory devices 4 and 6 when either or both of said memory devices are unavailable.

Figure 2:
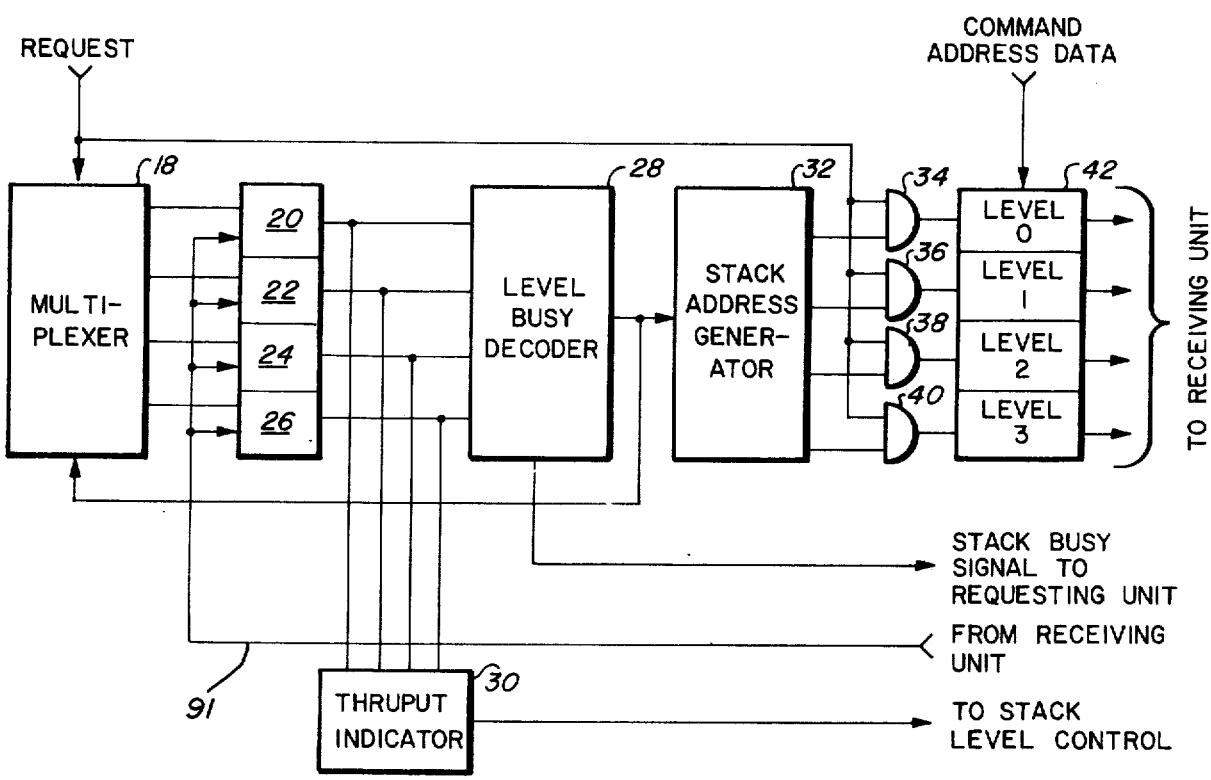
FIG. 2 is a block diagram of a memory controller stacking apparatus according to the present invention.

FIG. 2 is a functional block diagram of a stacking apparatus according to the present invention. Referring to FIG. 2, there is shown a four level stack 42. It should be noted at this point that stack 42 may be of any length, and the use of four levels is shown by way of example only. Stack 42 receives information which while shown as an input to level zero (or the first level) for convenience only, is actually applied to each level of the stack. When appropriate receiving units become available, the contents of a particular level of the stack is forwarded to the receiving unit in accordance with a priority scheme which is the subject U.S. Pat. No. 4,151,598 entitled "Priority Assignment Apparatus for Use in a Memory Controller" filed on even date herewith.

Each level of the stack has associated therewith a busy flip-flop. In FIG. 2, these are shown as flip-flops 20, 22, 24, and 26. When information is stored in a particular level of a stack, its associated level busy flip-flop is set. When information is read out of a particular level of the stack by a receiving unit, a signal is generated by the receiving unit which resets the corresponding level busy flip-flop.

The outputs of level busy flip-flops 20, 22, 24, and 26 are applied to inputs of level busy decoder 28, which by means of logic contained therein, determined the lowest level in the stack which is not occupied. If all of the levels are occupied, i.e., all of the level busy flip-flops are set, level busy decoder 28 generates a stack busy signal which is forwarded to the requesting unit informing it that its request cannot be processed at this time.

The output of level busy decoder 28 is used in two ways. First, it is fed back to an input of multiplexor 18. Requests received from requesting units are likewise applied to multiplexor 18 which produces an output on an appropriate line to set a level busy flip-flop of the lowest unoccupied level in the stack. Second, the output of level busy decoder 28 is applied to stack address generator 32. Address generator 32 generates an enabling signal which when combined with the request signal enables entry of the information into the lowest unoccupied level of the stack. This is accomplished via AND functions 34, 36, 38 and 40.

As suggested earlier, it would be desirable to have an indication of how busy the stack is in order to determine whether additional levels should be added or existing levels deleted. This may be accomplished by coupling the outputs of the level busy flip-flops into logic means designated in FIG. 2 as throughput indicator 30. This may consist of nothing more than a simple logic device which indicates the highest level in the stack which is occupied. Throughput indicator 30 generates a signal which is coupled to a stack level control means which either adds or deletes levels from the stack, not considered a part of the present invention.

Referring now to FIG. 3 there is shown a detailed logic diagram of a stacking apparatus in accordance with the present invention. As in FIG. 2, the stack is limited to four levels for the sake of explanation only. Levels 0, 1, 2, and 3 of stack 42 are enabled by the output of AND functions 66, 68, 70 and 72 respectively. Again, as shown in FIG. 2, information is applied to the first level only. However, it is to be understood that the information is likewise applied to each level in the stack.

Associated with each stack level is a level busy flip-flop. When flip-flop 44 is set, it indicates that level "0" is occupied. Flip-flops 46, 48, and 50 serve similar functions with respect to levels 1, 2, and 3 respectively.

Logic AND functions 52, 54, 56, and 58 serve to identify the lowest level in the stack which is not occupied. For example, AND function 52 has applied to one of its inputs the Q output of flip-flop 44 and to another of its inputs the $\bar{Q}$ output of flip-flop 46. Thus, the output of AND function 52 is high only when level "0" is occupied and level "1" is unoccupied. Similarly, AND gate 54 is so coupled to the outputs of the level busy flip-flops that it will generate an output f2 when levels "0" and "1" are occupied and level "2" is unoccupied. The output of AND function 56 (f3) indicates that all levels except the last level of the stack and occupied. These functions (f1, f2, and f3) are fed back and coupled to one of the inputs of AND functions 76, 78, and 80 respectively. A request for access is coupled to the second input of AND functions 74, 76, 78, and 80. In this manner, when a request is received, and a determination has been made as to which is the lowest unoccupied level in the stack, the appropriate level busy flip-flop is set. For example, if level "1" is the lowest unoccupied level in the stack, f1 is high, thus enabling AND function 76 to pass the request through to the set input of flip-flop 46. If level "2" is the lowest unoccupied level, f2 enables AND function 78 to pass the request through to the set input level busy flip-flop 48. Likewise, if level "3" is the lowest unoccupied level, f3 will gate the request signal through to the set input of flip-flop 50.

Logic AND function 74 has a first input coupled to the request signal and a second input coupled to the Q̄ output of flip-flop 44 which is the level busy flip-flop associated with the first level of the stack. Thus, if flip-flop 44 is not set indicating that level "0" in the stack is unoccupied, the request signal will be gated through AND function 74 to set flip-flop 44.

Logic AND function 58 has inputs coupled to the Q outputs of each of the level busy flip-flops 44, 46, 48, and 50. Thus, AND function 58 will generate an output only when all of the level busy flip-flops are set, i.e., all of the levels in the stack are occupied. This output is forwarded to the requesting unit to inform it that its request cannot be processed.

Simultaneous with the setting of the appropriate level busy flip-flop, the command, address and/or data is accepted and stored in the lowest unoccupied level of the stack. This is accomplished as follows.

Logic AND function 60 has coupled to its inputs the outputs of AND functions 52 and 56, i.e., f1 and f3.

Logic AND function 62 has coupled to its inputs the outputs of AND functions 54 and 56, i.e., f2 and f3. Thus the four possible combinations of outputs generated by AND functions 60 and 62 (00,01,10,11) are decoded in address generator 64 which may consist of nothing more than two bit decoder. When an address corresponding to level "0" of the stack is decoded, an enabling signal is transmitted on line 88 to AND function 66 which enables the actual request signal which is applied to its second input to clock the command, address and/or data into level "0". Similarly, addresses corresponding to levels 1, 2, and 3 result in enabling signals being generated by address register 64 on lines 86, 84, and 82 respectively. When the information in a particular level of the stack has been forwarded to its appropriate destination unit, a reset signal is generated by the destination unit and is applied to the corresponding level busy flip-flop to reset it via line 91. While only a single line as is shown, it should be clear that each destination has individual access to each level busy flip-flop so that each may be reset without affecting the others.

By monitoring the outputs of AND functions 52, 54, 56, and 58, an indication of how busy the stack is may be obtained in order to determine whether additional levels should be added to the stack or existing levels deleted. Further, it should be appreciated that it would be a relatively simple matter to bypass a particular level of the stack if said level is malfunctioning. This may be accomplished by simply forcing the associated level busy flip-flop to a set condition.

While the invention has been particularly shown and described with reference to a preferred embodiment thereof, it should be understood that changes in form and details may be made therein without departing from the spirit and scope of the invention.

What is claimed is:

1. In a data processing system of the type wherein a memory controller coordinates the transfer of information between at least one memory device and at least one requesting unit, a stacking apparatus for temporarily storing said information when said at least one memory device is unavailable, comprising:

a plurality of distinct storage levels each capable of storing information associated with a different request; and means for loading said information into the lowest unoccupied level.

2. A stacking apparatus according to claim 1, wherein said means for loading comprises:

indicating means associated with each level for indicating when each of said levels is occupied and when each of said levels is unoccupied;

decoding means coupled to said indicating means for determining the lowest unoccupied level;

generating means coupled to said decoding means for generating an address corresponding to the lowest unoccupied level;

enabling means coupled to said generating means for loading said information into the lowest unoccupied level; and means coupled to said decoding means for altering said indicating means associated with the lowest unoccupied level to reflect its occupation.

3. A stacking apparatus according to claim 2, wherein said indicating means comprises a level busy flip-flop associated with each of said levels which is set when information is loaded into its associated level and is reset when the information in its associated level is passed on to said at least one memory device.

4. A stacking apparatus according to claim 3, wherein said decoding means comprises logic mean having inputs coupled to the outputs of said level busy flip-flops, said logic means generating a first output indicative of the lowest unoccupied level and a second output when all of said levels are occupied.

5. A stacking apparatus according to claim 4, wherein said stack comprises first, second, third and fourth levels and said indicating means comprises first, second, third, and fourth level busy flip-flops, said logic means comprising:

first means for indicating that said second level is the lowest unoccupied level;

second means for indicating that said third level is the lowest unoccupied level;

third means for indicating that said fourth level is the lowest unoccupied level; and fourth means for indicating that said first, second, third and fourth levels are occupied.

6. A stacking apparatus according to claim 5, wherein said first, second, third, and fourth means are AND functions.

7. A stacking apparatus according to claim 4, wherein said means for altering comprises logic means responsive to said first output for setting the appropriate level busy flip-flop.

8. An apparatus for storing incoming data in a storage level of a multi-level storage stack, comprising:
   detecting means for determining the lowest level in said stack which is unoccupied; and
   enabling means coupled to said detecting means and to said stack for loading said data into said lowest level.

9. An apparatus according to claim 8, wherein said detecting means comprises:
   a plurality of level-busy flip-flops each associated with a particular level of said stack for indicating when said particular level is occupied and when said level is unoccupied; and
   decoding means coupled to said level-busy flip-flops for generating a signal indicative of the lowest unoccupied level in the stack.

10. An apparatus according to claim 9, wherein said enabling means comprises:
   generating means coupled to said decoding means for generating an address corresponding to the lowest unoccupied level; and
   loading means coupled to said generating means for loading said information into said lowest unoccupied level.

* * * * *